US008567255B2

(12) United States Patent
Aoki et al.

(10) Patent No.: US 8,567,255 B2
(45) Date of Patent: Oct. 29, 2013

(54) SEMICONDUCTOR PRESSURE SENSOR HAVING A RECESS WITH A LARGER AREA THAN A PLANAR SHAPE OF A DIAPHRAGM

(75) Inventors: Daigo Aoki, Niigata-ken (JP); Hideyuki Hashimoto, Niigata-ken (JP); Tetsuya Kobayashi, Niigata-ken (JP); Kunio Koizumi, Niigata-ken (JP); Yoshiaki Shimizu, Niigata-ken (JP); Yutaka Takashima, Niigata-ken (JP); Shinya Yokoyama, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 202 days.

(21) Appl. No.: 13/109,769

(22) Filed: May 17, 2011

(65) Prior Publication Data
US 2011/0214505 A1 Sep. 8, 2011

Related U.S. Application Data

(63) Continuation of application No. PCT/JP2009/066589, filed on Sep. 25, 2009.

(30) Foreign Application Priority Data

Nov. 17, 2008 (JP) ................................ 2008-292956

(51) Int. Cl.
*G01L 9/06* (2006.01)
(52) U.S. Cl.
USPC .............................................. 73/727; 73/715
(58) Field of Classification Search
None
See application file for complete search history.

(56) References Cited

U.S. PATENT DOCUMENTS

| | | | | |
|---|---|---|---|---|
| 4,236,137 A | * | 11/1980 | Kurtz et al. | 338/4 |
| 5,178,016 A | * | 1/1993 | Dauenhauer et al. | 73/727 |
| 5,357,807 A | * | 10/1994 | Guckel et al. | 73/721 |
| 5,471,086 A | * | 11/1995 | Ipposhi et al. | 257/417 |
| 5,614,678 A | * | 3/1997 | Kurtz et al. | 73/727 |
| 5,808,210 A | * | 9/1998 | Herb et al. | 73/862.59 |
| 6,056,888 A | * | 5/2000 | August | 216/16 |
| 6,278,167 B1 | * | 8/2001 | Bever et al. | 257/415 |

(Continued)

FOREIGN PATENT DOCUMENTS

| | | |
|---|---|---|
| JP | 6-341913 | 12/1994 |
| JP | 7-140027 | 6/1995 |

(Continued)

OTHER PUBLICATIONS

Search Report issued in corresponding PCT Application No. PCT/JP2009/066589; mailed Oct. 27, 2009.

*Primary Examiner* — Lisa Caputo
*Assistant Examiner* — Jermaine Jenkins
(74) *Attorney, Agent, or Firm* — Brinks Hofer Gilson & Lione

(57) ABSTRACT

There is provided a semiconductor pressure sensor which improves the sensor sensitivity and is excellent in the withstand pressure characteristic and the temperature characteristic. In the semiconductor pressure sensor in which a diaphragm is formed by a cavity provided on one of top and bottom surfaces of a silicon substrate and a plurality of piezoresistors is disposed in the diaphragm edge, a recess which has a larger area than the planar shape of the diaphragm and whose entire edge is located outward from the diaphragm edge in plan view is provided in a protective film which covers the entire surface of the silicon substrate on the diaphragm side. The protective film located on the diaphragm is preferably formed of $SiO_2$.

9 Claims, 6 Drawing Sheets

(56) References Cited

U.S. PATENT DOCUMENTS

| | | | |
|---|---|---|---|
| 6,635,530 B2* | 10/2003 | Helm et al. | 438/257 |
| 6,725,724 B2* | 4/2004 | Gluck | 73/715 |
| 6,928,878 B1* | 8/2005 | Eriksen et al. | 73/724 |
| 7,318,351 B2* | 1/2008 | Cobianu et al. | 73/715 |
| 7,404,247 B2* | 7/2008 | Eriksen et al. | 29/595 |
| 7,584,666 B2* | 9/2009 | Kim et al. | 73/727 |
| 7,918,136 B2* | 4/2011 | Muchow et al. | 73/721 |

FOREIGN PATENT DOCUMENTS

| | | |
|---|---|---|
| JP | 2000-124468 | 4/2000 |
| JP | 2000-356560 A | 12/2000 |
| JP | 2003-332586 A | 11/2003 |

\* cited by examiner

SEMICONDUCTOR PRESSURE SENSOR HAVING A RECESS WITH A LARGER AREA THAN A PLANAR SHAPE OF A DIAPHRAGM

CLAIM OF PRIORITY

This application is a Continuation of International Application No. PCT/JP2009/066589 filed on Sep. 25, 2009, which claims benefit of Japanese Patent Application No. 2008-292956 filed on Nov. 17, 2008. The entire contents of each application noted above are hereby incorporated by reference.

BACKGROUND OF THE INVENTION

1. Field of the Invention

The present invention relates to a semiconductor pressure sensor which measures pressure, such as atmospheric pressure.

2. Description of the Related Art

A diaphragm type semiconductor pressure sensor is known as a semiconductor pressure sensor which measures the tire pressure of a vehicle or the like. Generally, the diaphragm type semiconductor pressure sensor includes a semiconductor substrate having a diaphragm and a cavity for pressure detection on its top and bottom surfaces, respectively, and a base substrate bonded to the semiconductor substrate so as to seal the cavity, and has a rectangular sectional shape in which the cavity is formed by vertically cutting the surface of the semiconductor substrate. A plurality of piezoresistors (pressure-sensitive resistors) is disposed on each side of the diaphragm, and the midpoint electric potential of a bridge circuit formed by the plurality of piezoresistors is output as a pressure measurement voltage. For example, the diaphragm is distorted when the pressure is applied from the diaphragm side of the semiconductor substrate, and the resistance of the piezoresistor changes according to the degree of distortion. As a result, since the midpoint electric potential of the bridge circuit changes, the pressure can be measured on the basis of the midpoint electrical change.

In such a semiconductor pressure sensor, the diaphragm-side surface of the semiconductor substrate becomes a circuit surface including a portion of circuit wiring to piezoresistors, electrode pads, and the like. In this case, it is known that the device sensitivity can be adjusted by reducing the thickness of a protective film, which insulates and protects the circuit surface, on the diaphragm. JP-A-2000-356560 discloses a configuration in which the thickness of a surface oxide film 7 as a protective film is set to be small on a gauge resistor 5.

SUMMARY OF THE INVENTION protective film by milling, etching, or like in order to adjust the thickness of the protective film deteriorates the withstand pressure characteristic and the temperature characteristic. In addition, if the entire protective film is cut, an electrode pad formed on the circuit surface is cut to be thin. As a result, since a connection failure occurs or a protective film around the electrode pad becomes very thin, the reliability may be reduced.

The present invention provides a semiconductor pressure sensor which is excellent in withstand pressure characteristic and temperature characteristic and is able to improve the sensor sensitivity.

The present invention has been made based on the finding that if a recess, which reduces the thickness of a protective film on a diaphragm, is provided in the protective film and a step difference (recess edge) resulting from the recess is located outward from the diaphragm edge, more preferably, located outward from a piezoresistor in plan view, not only can the sensor sensitivity be improved but the withstand pressure and temperature characteristics are also improved compared with a case where a protective film with a uniform thickness is provided.

That is, according to an embodiment of the present invention, there is provided a semiconductor pressure sensor in which a diaphragm is formed by a cavity provided on one of top and bottom surfaces of a silicon substrate and a plurality of piezoresistors is disposed in the diaphragm edge. The semiconductor pressure sensor includes a protective film which covers the entire surface of the silicon substrate on the diaphragm side, and a recess which has a larger area than the planar shape of the diaphragm and whose entire edge is located outward from the diaphragm edge in plan view is provided in the protective film. More preferably, the edge of the recess is located outward from the plurality of piezoresistors in plan view.

The planar shape of the recess may be similar to the planar shape of the diaphragm. In addition, the recess may be formed anywhere other than a position overlapping a bonding pad for the piezoresistor formed in the silicon substrate.

Moreover, in the present invention, it has been found that the sensor sensitivity is noticeably improved if a protective film remaining on a diaphragm is formed of $SiO_2$ in a semiconductor pressure sensor with a structure in which a recess, which reduces the thickness of the protective film on the diaphragm, is provided in the protective film.

In order to form the protective film remaining on the diaphragm with $SiO_2$, specifically, the protective film may be formed by an $SiO_2$ film which covers the piezoresistors and an SiN film which covers a circuit wiring section of the piezoresistors disposed on the $SiO_2$ film and the SiN film may be removed to form a recess with a depth which exposes the $SiO_2$ film, for example. Alternatively, the protective film may be formed by a first $SiO_2$ film which covers the piezoresistors, a second $SiO_2$ film which covers a circuit wiring section of the piezoresistors disposed on the first $SiO_2$ film, and an SiN film which covers the second $SiO_2$ film, and the SiN film may be removed to form a recess with a depth which exposes the second $SiO_2$ film. Alternatively, the protective film may be formed by a first $SiO_2$ film which covers the piezoresistors and a second $SiO_2$ film which covers a circuit wiring section of the piezoresistors disposed on the first $SiO_2$ film, and the recess may be formed with a depth which exposes the second $SiO_2$ film.

According to the semiconductor pressure sensor of the embodiment of the present invention, the thickness of the protective film on the diaphragm is reduced by the recess formed in the protective film, and the step difference resulting from the recess is located at least outside the diaphragm edge in plan view. Therefore, not only the sensor sensitivity is improved, but also excellent withstand pressure and temperature characteristics are acquired. Moreover, in the semiconductor pressure sensor of the embodiment of the present invention, the protective film on the diaphragm is formed of $SiO_2$. Therefore, the sensor sensitivity is significantly improved compared with a case where the protective film on the diaphragm contains SiN.

DESCRIPTION OF THE PREFERRED EMBODIMENTS

Figure 1:
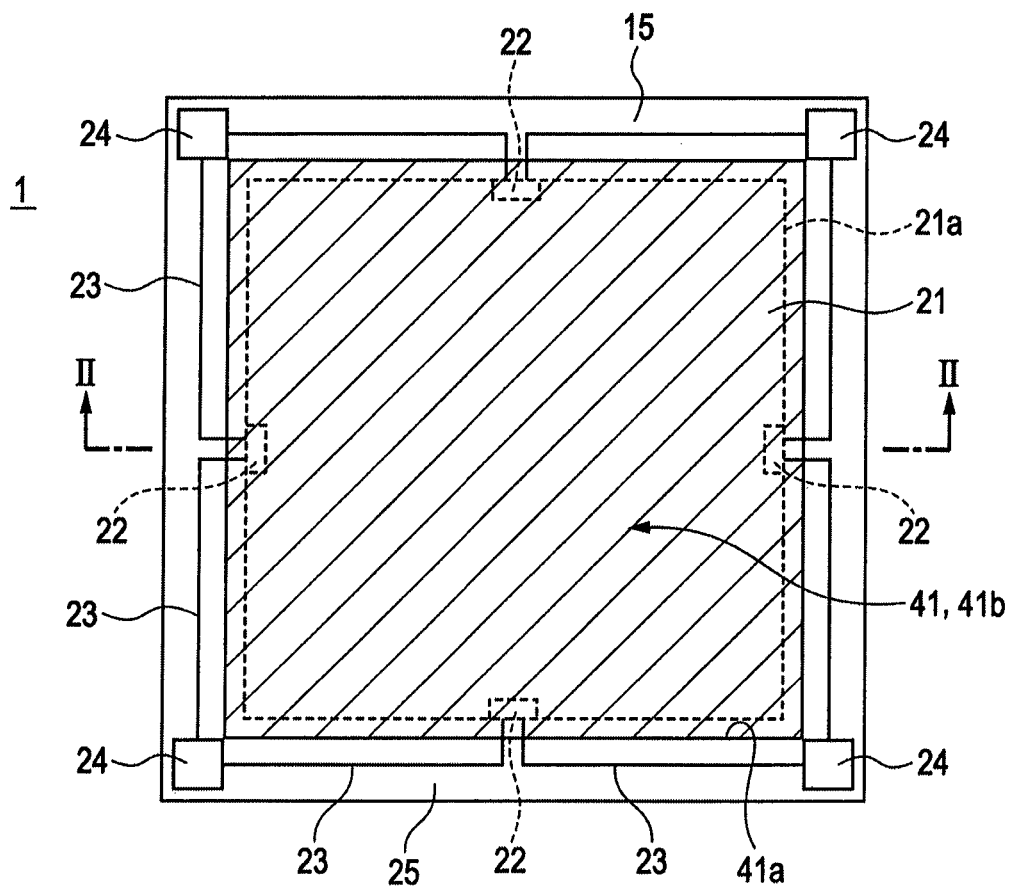
FIG. 1 is a plan view showing main parts in an embodiment of a semiconductor pressure sensor to which the present invention is applied.
Figure 2:
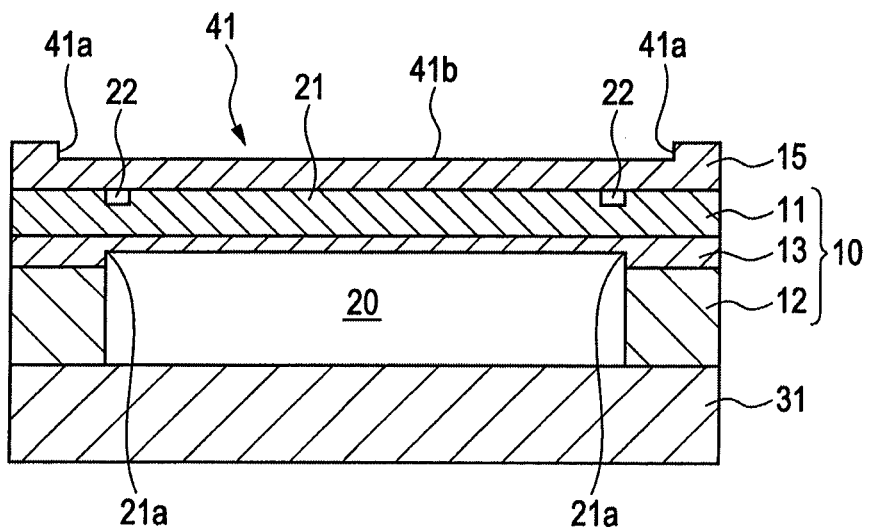
FIG. 2 is a cross-sectional view taken along the line II-II of FIG. 1, which shows main parts in the embodiment.

FIGS. 1 and 2 are plan and cross-sectional views, respectively, showing main parts of a semiconductor pressure sensor 1 to which the present invention is applied. The semiconductor pressure sensor 1 is a diaphragm type absolute pressure sensor and includes a semiconductor substrate 10 having a diaphragm 21 and a cavity 20 for pressure detection on its top and bottom surfaces, respectively, and a base substrate 31 bonded to the cavity 20 side surface of the semiconductor substrate 10 so as to seal the cavity 20 in a vacuum state.

The semiconductor substrate 10 is an SOI (Silicon On Insulator) substrate obtained by bonding first and second silicon substrates 11 and 12 to each other with a silicon oxide film (SiO$_2$) 13 interposed therebetween. A plurality of piezoresistors 22, which forms a bridge circuit, is formed so as to be embedded below the circuit surface (top surface in FIG. 1) of the first silicon substrate 11. The periphery of the plurality of piezoresistors 22 is filled with a silicon oxide film (not shown), and a circuit wiring section 23 and a bonding pad 24 bonded to each piezoresistor 22 are formed on the silicon oxide film. The entire circuit surface is covered by a passivation film 15 (protective film) formed of silicon nitride Si$_3$N$_4$ or the like, and the insulation of the piezoresistor 22, the circuit wiring section 23, and the first silicon substrate 11 is ensured by the passivation film 15. The bonding pad 24 is exposed from the passivation film 15.

In this semiconductor substrate 10, the cavity (recess) 20 is formed by removing parts of the second silicon substrate 12 and the silicon oxide film 13 from the second silicon substrate 12 side, and the diaphragm 21 is formed by the first silicon substrate 11 and the silicon oxide film 13 which forms the top surface of the cavity 20.

The diaphragm 21 of the present embodiment has a rectangular shape (square shape in plan view), and the outline of the rectangle is shown as a diaphragm edge 21a in FIG. 1 using a dotted line. In this specification, the diaphragm edge 21a is substantially the same as a cavity edge indicating the outline of the cavity 20. The piezoresistor 22 is formed so as to be placed on each side of the diaphragm edge 21a, and all piezoresistors 22 are located above the cavity 20. The outer peripheral region of the diaphragm 21 (diaphragm edge 21a) is a fixed region 25 which is not deformed by pressure change.

When the diaphragm 21 is distorted by the pressure applied to its outer surface, the resistance of the piezoresistor 22 changes with the distortion, and the midpoint electric potential of the bridge circuit formed by the piezoresistor 22 changes. The midpoint electric potential which varies according to the change in the resistance of the piezoresistor 22 is output to a known measuring apparatus as a sensor output.

In the semiconductor pressure sensor 1 with the configuration described above, a recess 41 which reduces the thickness of the passivation film 15 on the diaphragm 21 is formed in the passivation film 15. The sensitivity of piezoresistor 22 can be increased by reducing the thickness of the passivation film 15 on the diaphragm 21. In FIG. 1, the recess 41 is hatched. The planar shape of the recess 41 is a square which is similar to the diaphragm 21 and has a larger area than the diaphragm 21, and the entire edge (inner peripheral surface) 41a is located further outward from the piezoresistor 22 in plan view. That is, the recess edge 41a is located outward from the diaphragm edge 21a and the piezoresistor 22, and the passivation film 15 has a shape in which a step difference is given outward from the diaphragm edge 21a on its cross section.

The recess 41 can be formed by milling or etching the passivation film 15 after masking the peripheral portion so as to surround a portion which becomes the recess 41.

In the present embodiment, each side of the diaphragm edge 21a is set to 700 μm and each side of the recess 41 is set to 740 μm. Accordingly, the distance from the diaphragm edge 21a to the recess edge 41a is 20 μm. In addition, the thickness of the passivation film 15 is 0.3 to 1.1 μm in the recess 41 and 0.7 to 1.5 μm in the fixed area 25, for example.

Figure 3:
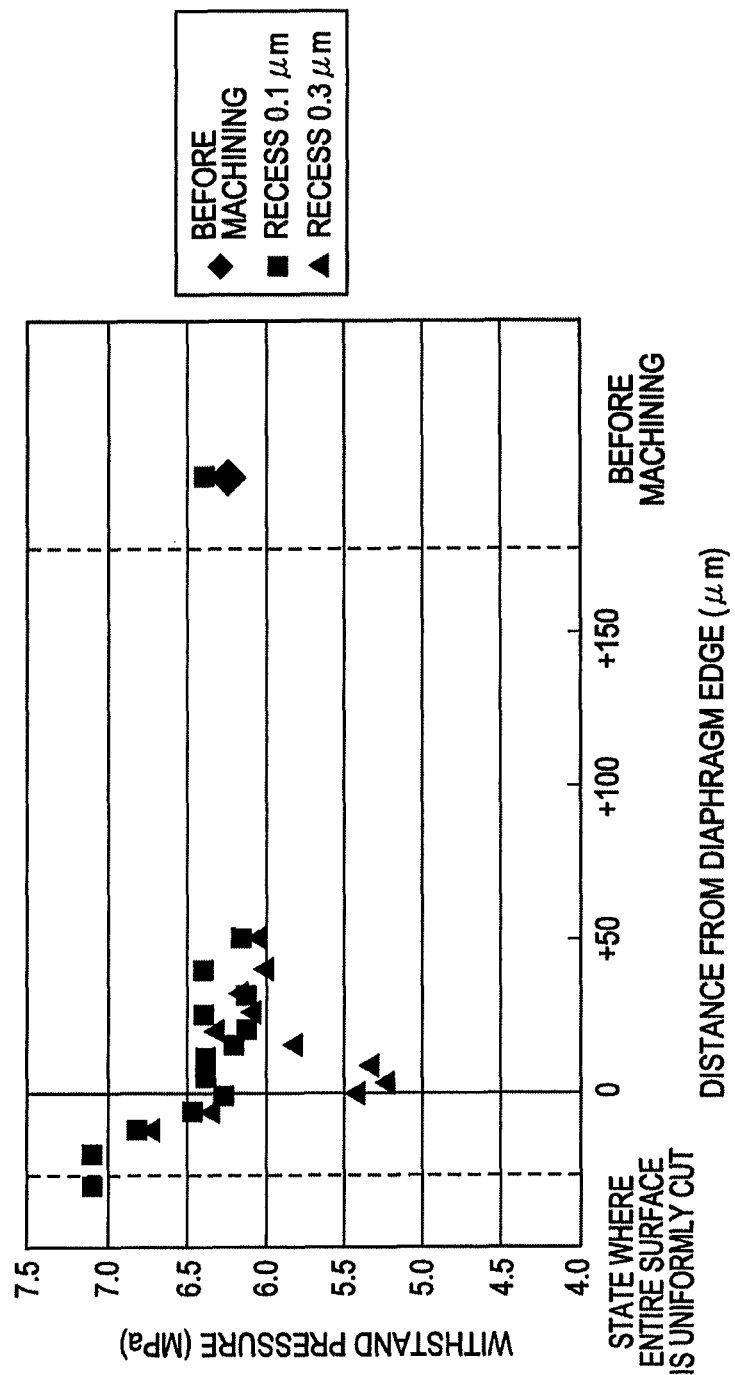
FIG. 3 is a graph showing the withstand pressure characteristic of a plurality of semiconductor pressure sensors with recesses formed by changing the distance from the diaphragm edge to the recess edge.

FIG. 3 shows a result after measuring the withstand pressure for each of a plurality of semiconductor pressure sensors with the recess 41 formed by changing the distance from the diaphragm edge 21a to the recess edge 41a. In the semiconductor pressure sensors used for measurement, each side of the diaphragm edge 21a is 700 μm.

In FIG. 3, plots ♦, ■, and ▲ indicate recess depths of 0.0 mm (no recess), 0.1 μm, and 0.3 μm, respectively. Moreover, in FIG. 3, the inside of a diaphragm is set as positive and the outside of a diaphragm is set as negative in regard to the distance [μm] from the diaphragm edge 21a. The end position of the piezoresistor 22 is at a distance of 0 μm from the diaphragm edge 21a. The plot at the right end of FIG. 3 shows a state before recess machining, and the plot at the left end of FIG. 3 shows a state where the entire surface of the passivation film 15 has been cut uniformly.

As is apparent from FIG. 3, when the recess edge 41a is located outward from the diaphragm edge 21a, the withstand pressure exceeds 7.0 MPa. As the distance of the recess edge 41a from the diaphragm edge 21a in the outward direction increases, the withstand pressure becomes greater than in a state before recess machining and the case where the recess edge 41a is located inside the diaphragm edge 21a. Since the withstand pressure before recess machining is 6.2 to 6.4 MPa, the withstand pressure when the recess edge 41a is located outward from the diaphragm edge 21a increases by 10% or more. This tendency is the same as in both the case where the recess depth is 0.1 μm and the case where the recess depth is 0.3 μm. In addition, also in the state where the entire surface of the passivation film 15 is uniformly cut, almost the same withstand pressure as in the case where the distance from the diaphragm edge 21a is set to −20 μm can be obtained. On the other hand, if the recess edge 41a is located inward from the diaphragm edge 21a, the same withstand pressure as before recess machining is obtained when the recess depth is 0.1 μm, but the withstand pressure becomes lower than before recess machining when the recess depth is 0.3 μm. In particular, in a range which overlaps the piezoresistor 22 and in which the distance from the cavity edge 21a is about 0 to +15 μm, a drop in the withstand pressure is large.

If the recess edge 41a is located inward from the diaphragm edge 21a, stress tends to concentrate on the step difference of the recess edge 41a. As a result, the recess edge 41a may be broken due to bending stress of the diaphragm 21. In contrast, if the recess edge 41a is located outward from the diaphragm edge 21a similar to the present embodiment, the influence of bending stress of the diaphragm 21 is reduced. As a result, the withstand pressure is improved.

Figure 4:
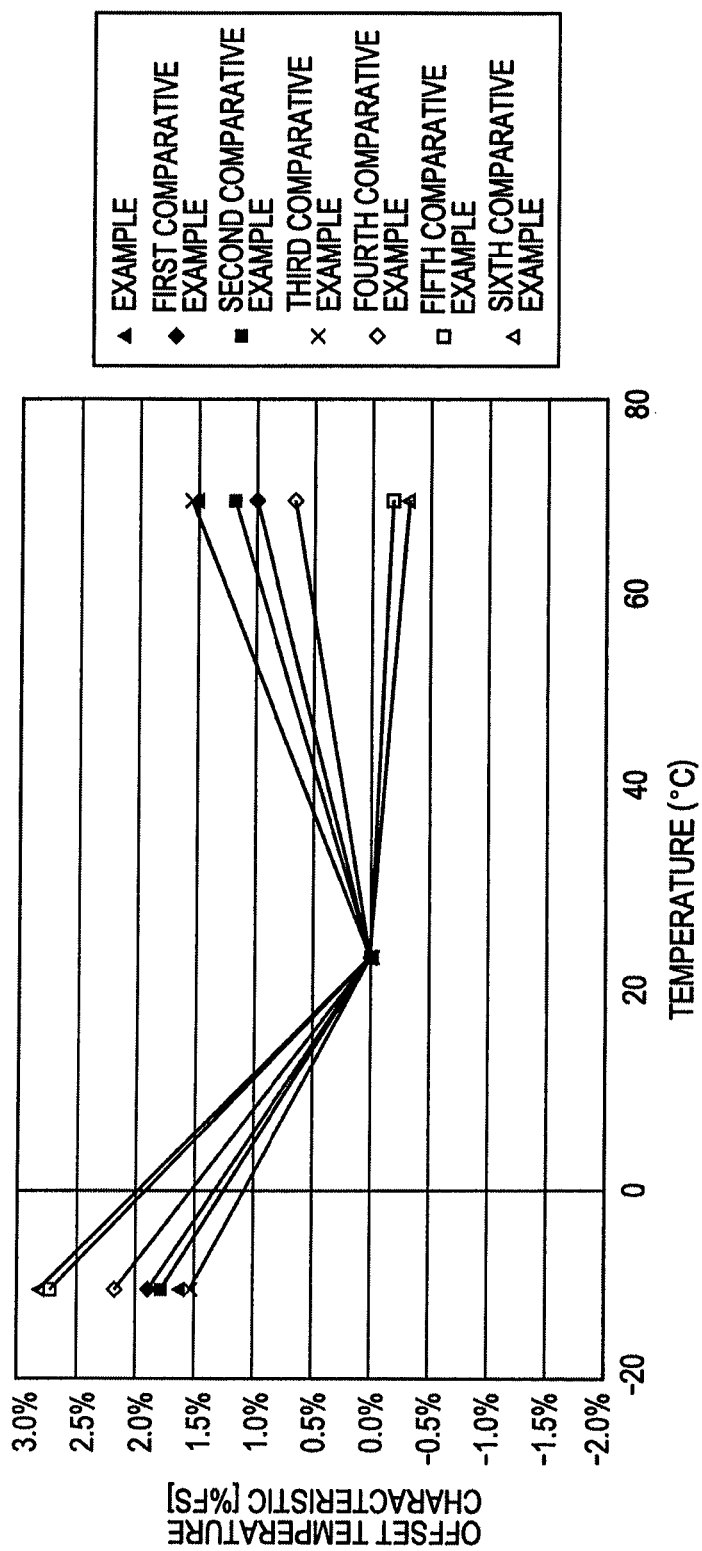
FIG. 4 is a graph showing the temperature characteristic of a plurality of semiconductor pressure sensors with recesses formed by changing the distance from the diaphragm edge to the recess edge.

FIG. 4 shows a result after measuring the temperature characteristic for each of a plurality of semiconductor pressure sensors with the recess 41 formed by changing the distance from the diaphragm edge 21a to the recess edge 41a. In this measurement, the temperature was changed to −10° C., 25° C., and 70° C. to acquire the output values of $H_{-10°\,C.}$, $H_{25°\,C.}$, and $H_{70°\,C.}$ in a high pressure state and the output values of $L_{-10°\,C.}$, $L_{25°\,C.}$, and $L_{70°\,C.}$ in a low pressure state. FIG. 4 is a graph in a high pressure state and is obtained by plotting an offset temperature characteristic [% FS], which is obtained by dividing a difference between the output value at each temperature and the output value at 25° C. by the span voltage ($H_{25°\,C.}$-$L_{25°\,C.}$), on the vertical axis when the horizontal axis indicates a temperature. In the semiconductor pressure sensors used for measurement, each side of the diaphragm edge 21a is 700 μm.

In FIG. 4, a plot ▲ indicates an example (each side of the recess 41 is 720 μm) where the recess edge 41a is located 10 μm outward from the diaphragm edge 21a. Plots ♦, ■, and x indicate a first comparative example in a state before recess machining (passivation film is 1.2 μm), a second comparative example (passivation film is 0.9 μm) in which the entire surface of the passivation film 15 is uniformly cut, and a third comparative example (each side of the recess 41 is 700 μm) in which the recess edge 41a is matched with the diaphragm edge 21a, respectively. In addition, plots ◇, □, and ∆ indicate a fourth comparative example (each side of the recess 41 is 660 μm) in which the recess edge 41a is located 20 μm inward from the diaphragm edge 21a, a fifth comparative example (each side of the recess 41 is 600 μm) in which the recess edge 41a is located 50 μm inward from the diaphragm edge 21a, and a sixth comparative example (each side of the recess 41 is 540 μm) in which the recess edge 41a is located 80 μm inward from the diaphragm edge 21a, respectively. The recess depth is fixed (0.3 μm).

Referring to FIG. 4, the same offset temperature characteristic as in the state before recess machining (first comparative example; plot ■) is obtained in the case where the entire surface of the passivation film 15 is uniformly cut (the second comparative example; plot ■), the case where the recess edge 41a is located outward from the diaphragm edge 21a (embodiment; plot ▲), and the case where the recess edge 41a is matched with the diaphragm edge 21a (third comparative example; plot x). That is, there is no change in the offset temperature characteristic. In contrast, in the case where the recess edge 41a is located 20 μm or more inward from the diaphragm edge 21a (fourth to sixth comparative examples: plots ◇, □, and ∆), symmetry is broken compared with the state before recess machining (first comparative example: plot ♦), and the offset temperature characteristic changes. Since the recess 41 is located largely inward from the diaphragm edge 21a, a variation in the offset temperature characteristic is large and the inclination also changes.

As described above, according to FIGS. 3 and 4, it is apparent that the excellent withstand pressure characteristic and temperature characteristic are obtained by positioning the recess 41 (recess edge 41a), which is formed in the passivation film 15, outward from the diaphragm edge 21a.

In addition, in the case where the entire surface of the passivation film 15 is uniformly cut, the withstand pressure characteristic and the temperature characteristic are excellent as described above but the bonding pad 24 and the periphery is cut, resulting in connection failure or a reduction in reliability. Accordingly, this is not preferable.

Figure 5:
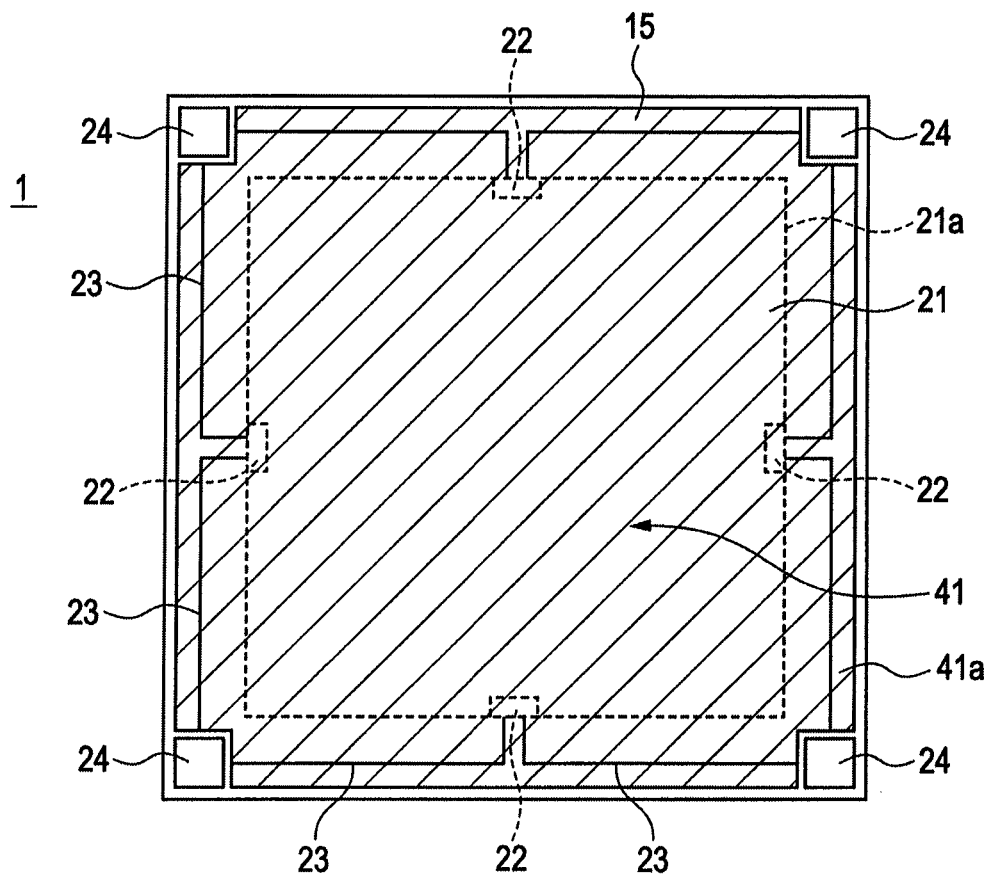
FIG. 5 is a plan view showing a modification of a recess.

In the present embodiment, the planar shape of the recess 41 is similar to that of the diaphragm 21. However, it may also be formed so as to exclude the bonding pad 24 as shown in FIG. 5. In addition, the planar shape of the recess 41 is not limited to the example. For example, the shape of the recess 41 may be shifted by about 2° from the crystal orientation of the first silicon substrate 11, so that the progress of cracking along the crystal orientation can be suppressed.

In addition, although the recess edge 41a and the recess bottom surface 41b form an angle and the recess edge 41a and the diaphragm 21 form an angle in the present embodiment, they may be given roundness or the recess edge 41a may be formed as an inclined surface. Although the recess bottom surface 41b is flat, the recess bottom surface 41b may be formed such that the depth increases gradually toward the middle, that is, the passivation film 15 becomes thin gradually toward the middle of the diaphragm 21.

Next, second to fourth embodiments, in which only a protective film formed of $SiO_2$ is left on a diaphragm by forming a recess in the protective film which covers the circuit surface of a silicon substrate, will be described with reference to FIGS. 6 to 9.

Figure 6:
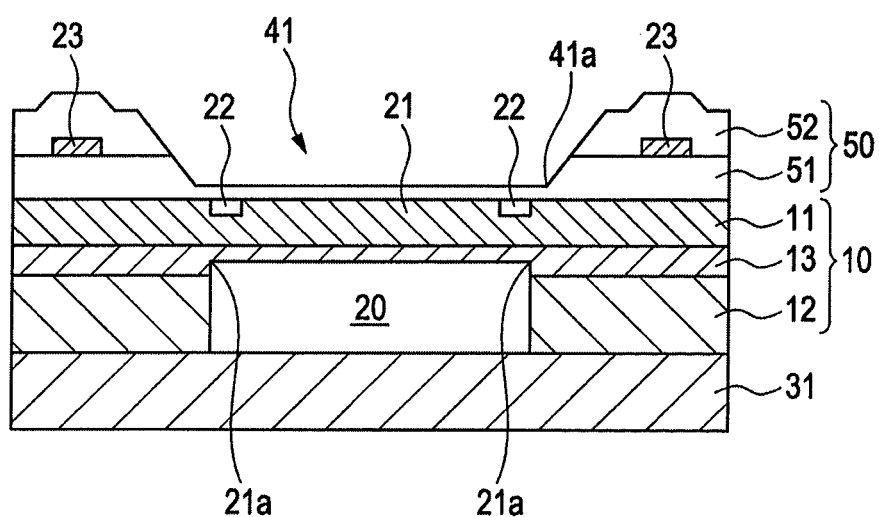
FIG. 6 is a cross-sectional view showing main parts of a semiconductor pressure sensor according to a second embodiment.

FIG. 6 is a cross-sectional view taken along the line II-II of FIG. 1, which shows main parts of a semiconductor pressure sensor according to the second embodiment. A protective film 50 which covers the entire substrate surface is formed on the circuit surface of a first silicon substrate 11. The protective film 50 is a laminated film having an $SiO_2$ film 51, which covers a plurality of piezoresistors 22 formed so as to be embedded below the circuit surface, and an SiN film 52, which covers the circuit wiring section 23 disposed on the $SiO_2$ film 51. On the diaphragm 21 in the protective film 50, a recess 41 with a depth reaching the $SiO_2$ film 51 is formed by removing the SiN film 52. The $SiO_2$ film 51 is exposed to the recess 41. Similar to the first embodiment, the planar shape of the recess 41 is a square which is similar to the diaphragm 21 and has a larger area than the diaphragm 21, and the entire edge (inner peripheral surface) 41a is located further outward from the piezoresistor 22 in plan view. Therefore, only the $SiO_2$ film 51 is present on the diaphragm 21, and the SiN film 52 and the $SiO_2$ film 51 are present above and below a circuit wiring section 23 located outward from the piezoresistor 22, respectively. In the second embodiment, the entire passivation film 15 on the diaphragm 21 in the first embodiment described above is cut to form the recess 41. The $SiO_2$ film 51 is equivalent to a silicon oxide film which is not shown in FIG. 1, and the SiN film 52 is equivalent to the passivation film 15. Specifically, the thickness of the $SiO_2$ film 51 on the diaphragm 21 is about 100 to 350 nm, the thickness of the $SiO_2$ film 51 located at the circuit wiring section 23 side is about 400 nm, and the thickness of the SiN film 52 located at the circuit wiring section 23 side is about 700 to 1500 nm.

Figure 7:
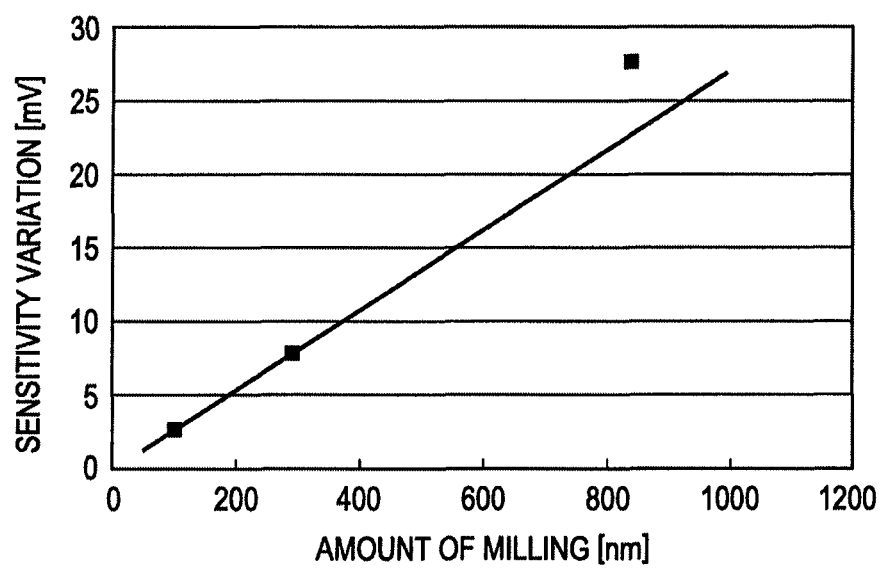
FIG. 7 is a graph showing the relationship between the sensitivity variation of a semiconductor pressure sensor and the amount of milling of a protective film on a diaphragm.

FIG. 7 shows a result after measuring the relationship between the amount of milling [nm] of the protective film 50 and the sensor sensitivity variation [mV]. In this measurement, a sensitivity variation when the $SiO_2$ film 51 with a thickness of about 400 nm and the SiN film 52 with a thickness of about 800 nm are formed in the semiconductor pressure sensor of the second embodiment described above and the recess 41 is formed with the predetermined amount of milling. The SiN film 52 is exposed to the recess 41 until the amount of milling becomes about 800 nm (the $SiO_2$ film 51 and the SiN film 52 are present on the diaphragm 21), and the $SiO_2$ film 51 is exposed to the recess 41 when the amount of milling exceeds about 800 nm (only the $SiO_2$ film 51 is present on the diaphragm 21).

As is well-known, the thickness of the protective film 50 on the diaphragm 21 decreases as the amount of milling increases, and the sensor sensitivity is improved accordingly. Referring to FIG. 7, the sensitivity variation is proportional to the amount of milling in a state where the SiN film 52 is exposed to the recess 41. However, when the amount of milling exceeds about 800 nm to expose the $SiO_2$ film 51 to the recess 41, the proportional relationship indicated by the straight line in FIG. 7 is no longer satisfied and the sensor sensitivity is significantly increased. It is apparent that the sensitivity is noticeably improved by forming the protective film on the diaphragm 21 only with $SiO_2$ compared with a case where the thickness of a protective film is reduced with an SiN film left.

Figure 8:
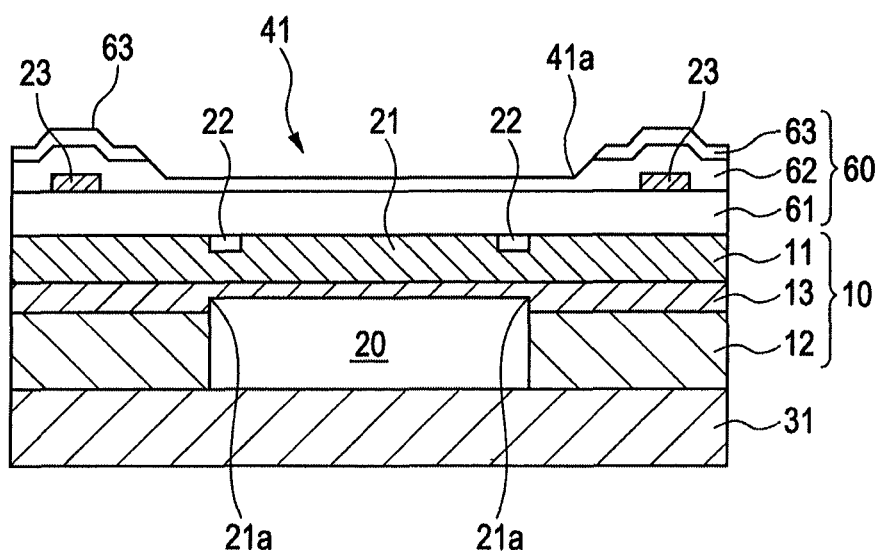
FIG. 8 is a cross-sectional view showing main parts of a semiconductor pressure sensor according to a third embodiment.

FIG. 8 is a cross-sectional view taken along the line II-II of FIG. 1, which shows main parts of a semiconductor pressure sensor according to the third embodiment. In the third embodiment, a protective film 60 is formed by a first $SiO_2$ film 61 which covers a plurality of piezoresistor 22 formed so as to be embedded below the circuit surface of a first silicon substrate 11, a second $SiO_2$ film 62 which covers the circuit wiring section 23 disposed on the first $SiO_2$ film 61, and an SiN film 63 which covers the second $SiO_2$ film 62, and the recess 41 is formed with a depth which exposes the second $SiO_2$ film 62 by removing the SiN film 63. Similar to the first and second embodiments, the planar shape of the recess 41 is a square which is similar to the diaphragm 21 and has a larger area than the diaphragm 21, and the entire edge (inner peripheral surface) 41a is located further outward from the piezoresistor 22 in plan view. Therefore, the first and second $SiO_2$ films 61 and 62 are present on the diaphragm 21, and the SiN film 63 and the second $SiO_2$ film 62 and the first $SiO_2$ film 61 are present above and below a circuit wiring section 23 located outward from the piezoresistor 22, respectively. By forming the protective film which covers the circuit wiring section 23 using the second $SiO_2$ film 62 and the SiN film 63, the amount of milling required for removing the SiN film 63 (when the protective film on the diaphragm 21 is formed of only $SiO_2$) is reduced. As a result, manufacturing becomes easy. Also in the present embodiment, since the protective film on the diaphragm 21 is formed of only $SiO_2$, it is possible to improve the sensor sensitivity significantly similar to the second embodiment, compared with a case where the protective film on the diaphragm 21 contains SiN. Specifically, the thickness of the protective film 60 on the diaphragm 21 is about 400 to 1300 nm, the thickness of the first $SiO_2$ film 61 located at the circuit wiring section 23 side is about 400 nm, the thickness of the second $SiO_2$ film 62 located at the circuit wiring section 23 side is about 50 to 1400 nm, and the thickness of the SiN film 63 located at the circuit wiring section 23 side is about 100 to 1450 nm. In the third embodiment, the recess 41 may be formed with a depth which exposes the first $SiO_2$ film 61 which covers the piezoresistor 22, similar to the second embodiment.

Figure 9:
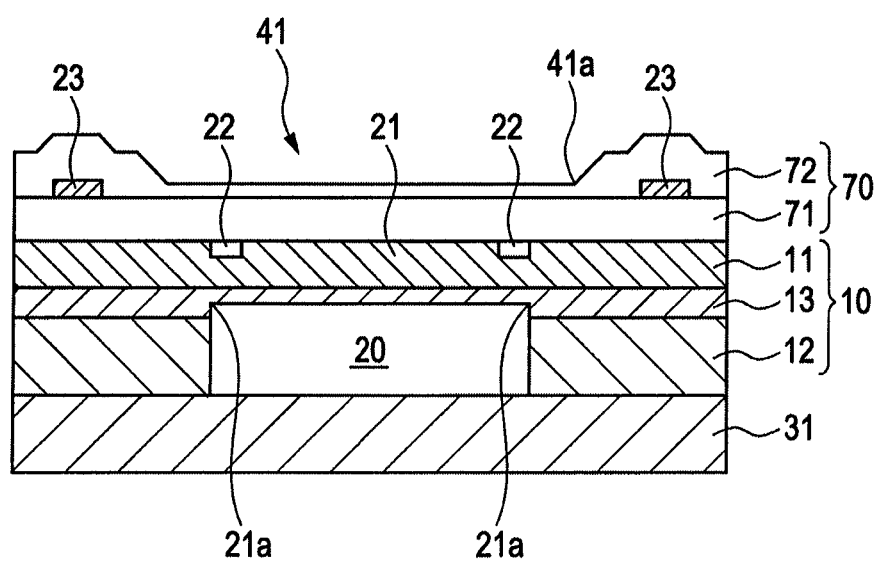
FIG. 9 is a cross-sectional view showing main parts of a semiconductor pressure sensor according to a fourth embodiment.

FIG. 9 is a cross-sectional view taken along the line II-II of FIG. 1, which shows main parts of a semiconductor pressure sensor according to the fourth embodiment. In the fourth embodiment, a protective film 70 is formed by a first $SiO_2$ film 71, which covers a plurality of piezoresistor 22 formed so as to be embedded below the circuit surface of a first silicon substrate 11, and a second $SiO_2$ film 72, which covers the circuit wiring section 23 disposed on the first $SiO_2$ film 71, and the recess 41 is formed by cutting the second $SiO_2$ film 72. Similar to the first to third embodiments, the planar shape of the recess 41 is a square which is similar to the diaphragm 21 and has a larger area than the diaphragm 21, and the entire edge (inner peripheral surface) 41a is located further outward from the piezoresistor 22 in plan view. By forming the protective film 70 using only $SiO_2$ as described above, it is possible to improve the sensor sensitivity significantly similar to the second embodiment, compared with a case where the protective film on the diaphragm 21 contains SiN. In addition, since the recess 41 can be formed with a small amount of milling, the manufacturing process becomes easy. Specifically, the thickness of the protective film 70 on the diaphragm 21 is about 400 to 1450 nm, the thickness of the first $SiO_2$ film 71 located at the circuit wiring section 23 side is about 400 nm, and the thickness of the second $SiO_2$ film 72 located at the circuit wiring section 23 side is about 700 to 1500 nm. In the fourth embodiment, the recess 51 may be formed with a depth which exposes the first $SiO_2$ film 71 which covers the piezoresistor 22, similar to the second embodiment.

While the embodiments in which the present invention is applied to the absolute pressure sensor when the cavity 20 is in a vacuum state have been described, the present invention may also be applied to a differential pressure sensor or a gauge pressure sensor in which a pressure inlet is formed in the base substrate 31 so that the cavity 20 communicates with the outside.

The present invention of this application is applicable to semiconductor pressure sensors for vehicles.

It should be understood by those skilled in the art that various modifications, combinations, sub-combinations and alterations may occur depending on design requirements and other factors insofar as they are within the scope of the appended claims of the equivalents thereof.

What is claimed is:

1. A semiconductor pressure sensor in which a diaphragm is formed by a cavity provided on one of top and bottom surfaces of a silicon substrate and a plurality of piezoresistors is disposed in the diaphragm edge, comprising:
    a protective film which covers the entire surface of the silicon substrate on the diaphragm side,
    wherein a recess which has a larger area than a planar shape of the diaphragm and whose entire edge is located outward from the diaphragm edge in plan view is provided in the protective film.

2. The semiconductor pressure sensor according to claim 1, wherein an edge of the recess is located outward from the plurality of piezoresistors in plan view.

3. The semiconductor pressure sensor according to claim 1, wherein a planar shape of the recess is similar to the planar shape of the diaphragm.

4. The semiconductor pressure sensor according to claim 1, wherein the recess is formed except for a position overlapping a bonding pad for the piezoresistor formed in the silicon substrate.

5. The semiconductor pressure sensor according to claim 1, wherein the protective film located on the diaphragm is formed of $SiO_2$.

6. The semiconductor pressure sensor according to claim 5, wherein the protective film has an $SiO_2$ film which covers the piezoresistors and an SiN film which covers a circuit wiring section of the piezoresistors disposed on the $SiO_2$ film, and the recess is formed with a depth which exposes the $SiO_2$ film.

7. The semiconductor pressure sensor according to claim 5, wherein the protective film has a first $SiO_2$ film which covers the piezoresistors, a second $SiO_2$ film which covers a circuit wiring section of the piezoresistors disposed on the first $SiO_2$ film, and an SiN film which covers the second $SiO_2$ film, and the recess is formed with a depth which exposes the second $SiO_2$ film.

8. The semiconductor pressure sensor according to claim 5, wherein the protective film has a first $SiO_2$ film which covers the piezoresistors and a second $SiO_2$ film which covers a circuit wiring section of the piezoresistors disposed on the first $SiO_2$ film, and the recess is formed with a depth which exposes the second $SiO_2$ film.

9. The semiconductor pressure sensor according to claim 1, wherein the entire surface on the diaphragm side is flat and the recess is formed by reducing the thickness of the protective film which covers the entire surface on the diaphragm side.

* * * * *